April 17, 1928.  E. C. G. ENGLAND  1,666,814
MOTOR VEHICLE
Filed Feb. 6. 1926   3 Sheets-Sheet 1
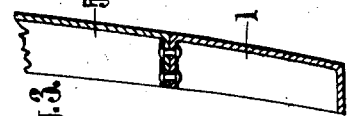
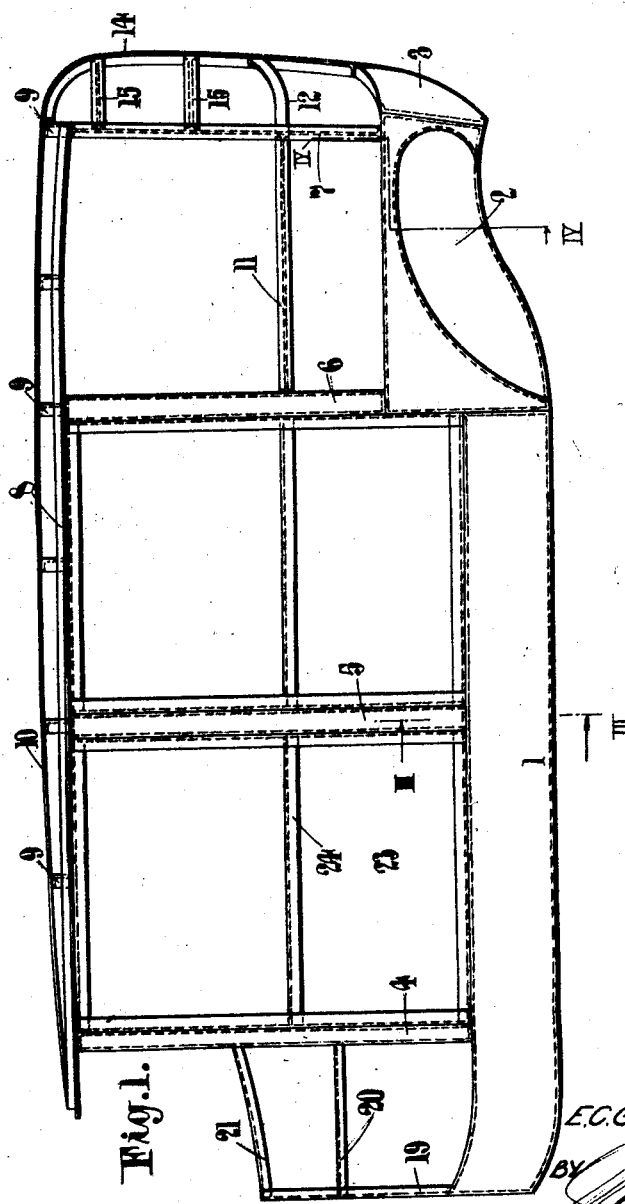
INVENTOR
E.C.G.ENGLAND
BY
ATTORNEY April 17, 1928.  E. C. G. ENGLAND  1,666,814
MOTOR VEHICLE
Filed Feb. 6, 1926  3 Sheets-Sheet 2
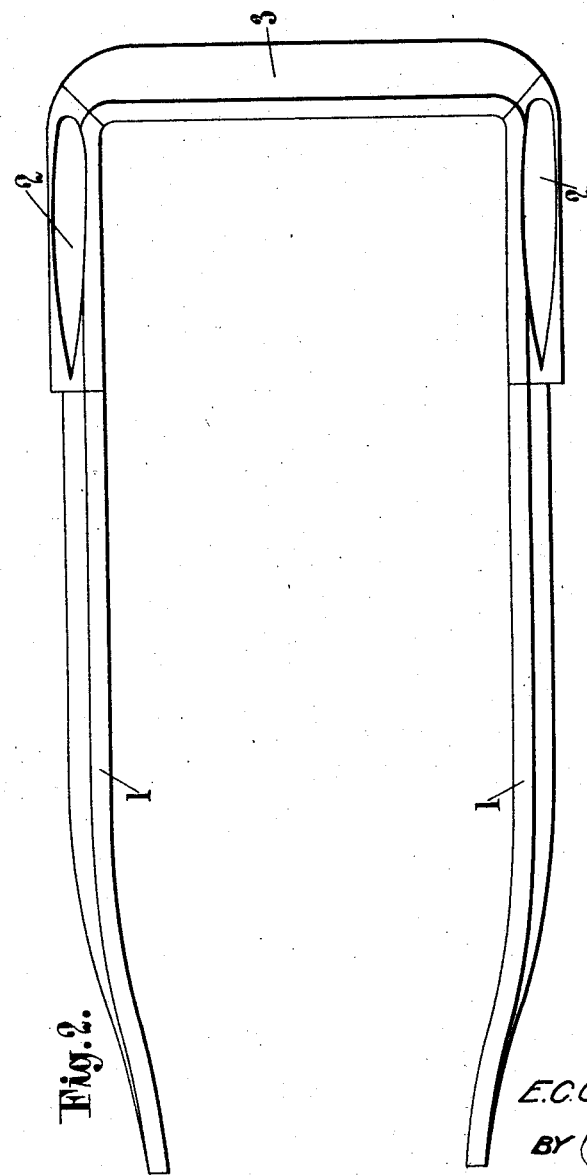
INVENTOR
E.C.G. ENGLAND,
BY
ATTORNEY April 17, 1928.  1,666,814

E. C. G. ENGLAND

MOTOR VEHICLE

Filed Feb. 6, 1926   3 Sheets-Sheet 3

INVENTOR
E.C.G. England,
BY
ATTORNEY

Patented Apr. 17, 1928.

1,666,814

UNITED STATES PATENT OFFICE.

ERIC CECIL GORDON ENGLAND, OF LONDON, ENGLAND.

MOTOR VEHICLE.

Application filed February 6, 1926, Serial No. 86,544, and in Great Britain May 14, 1925.

My invention relates to motor vehicles.

My invention has for its object to provide an improved body of rigid construction and light weight, the assembly of the body on the chassis being such as to reduce distortion to a minimum and practically eliminate vibration or rattling of the body components.

Referring now to the accompanying drawings,

Figure 1, shows an elevation of a motor body constructed according to my invention, while, Figure 2, shows an inverted plan of same.

Figure 3, shows a cross-section through the line III—III, on Figure 1.

Figure 4, shows a cross-section through the line IV—IV, on Figure 1.

Figure 5:
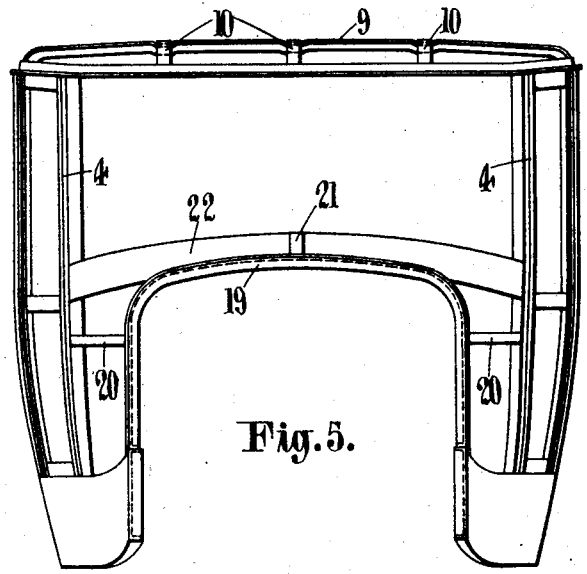
Figures 5 and 6, show front and rear end elevations of the body shown in Figure 1.
Figure 6:
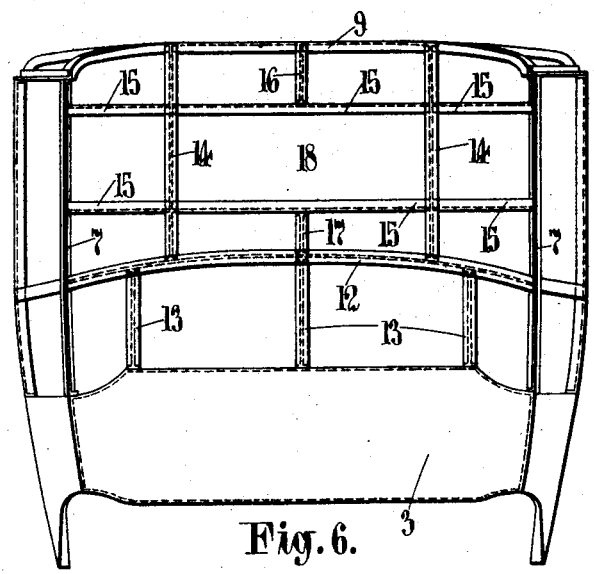

In carrying my invention into effect, according to one form and as applied by way of example to a body of the saloon type, I assemble the skeleton structure on a girder member of U-shape in plan.

The girder member, in the present example, is constructed of five portions bolted together. The two front portions, 1, of the girder are of channel section, while the rear portions, 2, are formed as pressings as is also the end member, 3.

On the girder member, uprights, 4, 5, 6 and 7, are assembled on each side of the body, the uprights, 4, 5 and 6, being formed of light channel section, while the upright, 7, is of T-section.

The upper ends of the uprights, 4, 5, 6 and 7, are attached to a top rail, 8, which extends round the front and sides of the body. The top rail, 8, is preferably formed of angle section and carries a framework formed of a series of transverse angle bars, 9, and longitudinal strips, 10, for supporting the material with which the roof is covered.

Between the uprights, 6 and 7, an intermediate transverse member, 11, of T-section extends on each side of the body, and the members, 7, are interconnected by a member, 12, of similar section. Between the member, 12, and the portion, 3, of the girder, three uprights, 13, of T-section are arranged, while between the member, 12, and the rearmost of the members, 9, two members, 14, also of T-section and with curved upper ends are disposed.

Cross-members, 15, connect the uprights, 14, with one another and also with the members, 7, while the members, 15, are connected with the members, 9 and 12, by members, 16 and 17. The members, 15, 16 and 17, are also of T-section.

The space, 18, may be used for the rear window.

The scuttle is formed by an arched member, 19, of angle section, attached to the front ends of the girder member, and two cross-members, 20, of T-section extending between the member, 19, and the members, 4, with a member, 21, also of T-section extending between the cross-member, 22, which is formed as a pressing, and the member, 19.

The doors, 23, are formed as frames of angle section material with a cross-member, 24, of similar section.

The members of the skeleton structure of the body may be connected together by means of rivets, bolts or it may be by welding.

The girder member, in the present example, may be formed of steel, but in some cases, I may arrange to form it of aluminium or an alloy thereof, either as pressings or castings, or by rolling certain portions and forming the other portions as pressings or castings.

As the design of the girder member may be varied from that above described, its method of construction will depend, to a great extent on its design. For example, I may form it in a single piece by suitably bending or otherwise forming a bar of channel or other section to the desired shape.

The girder member may also be arranged so as to form part of the outside skin of the body and also if desired of the door frames.

The members of the skeleton structure of the body may be of rolled steel or they may be formed of aluminium or any suitable alloy thereof, either cast or rolled, although in some cases, I may form the skeleton structure wholly of timber or it may be partly of metal or partly of timber.

The skeleton structure may be covered on the outside with metal panels, or it may be covered with plywood, fabric, or any other suitable material. In some cases, some portions of the structure may be covered with one of the above materials and the remainder with one or more of the other materials.

As the body as above described, does not carry the seats which are attached directly to the chassis, the body components may be made of very light section.

The body may preferably be attached to the chassis at three points, the portion, 3, of the girder member being connected at its central point with the rear transverse member of the chassis, while the forward ends of the portions, 1, are connected to the longitudinal members of the chassis.

The rear connection of the body may be a universal joint, either of the ball and socket type or it may be of the leather or fabric type, in which a strip of either of these materials is attached at its ends to the body and at its centre to the chassis by means of a single bolt, or vice versa.

At its forward ends, the body is attached by means of suitably formed plates, rigidly to the chassis, although in some cases, I may attach it at these points by means of universal joints in a similar manner to the rear connection.

Again instead of supporting the skeleton structure of the body on a U-shaped girder as above described, it may be supported on a frame of rectangular shape, consisting of side girder members, interconnected by one or more cross-members.

Also the girder member may be formed with its lower flange of greater width than the upper flange to increase the lateral stiffness of the member, while the width and depth of the girder may vary from point to point as required.

The weight of the girder member may be reduced by suitably arranged lightening holes, if desired.

Further the body, may, in some cases, be attached to the chassis at four or more points if desired.

Although I have described my invention as applied by way of example to a body of the saloon type, it may be applied to other types of closed bodies and also to open bodies.

By means of my invention, an exceedingly rigid construction of relatively light weight may be provided at a comparatively low cost, the arrangement and suspension of which on the chassis is such as to practically eliminate all noises arising from vibration or movement of the body components.

I claim:—

1. A motor vehicle body having in combination, a girder member extending along both sides and an end of said body, said girder member having wheel housings integrally formed therewith, and a skeleton for the body covering incorporated with said girder member.

2. A motor vehicle having in combination, side girder members, a rear girder member and intermediate members formed as wheel housings, interposed between said side and rear girder members together with a skeleton structure for the body covering incorporated with said side and intermediate members and said rear member.

3. A motor vehicle body including side girder members, a rear girder member and intermediate members formed as wheel housings and interposed between said side members and said rear member, a top rail extending along the front and sides of said body and having a framework of longitudinal and transverse members incorporated therewith, upright members interconnecting said top rail, said side and intermediate members together with a skeleton structure extending between the rearmost of said upright members, said rear girder member and said top rail framework.

4. A motor vehicle body including a girder member extending along both sides and an end of said body, said girder member having wheel housings integrally formed therewith.

In testimony whereof I have signed my name to this specification.

ERIC CECIL GORDON ENGLAND.